Figure 1:
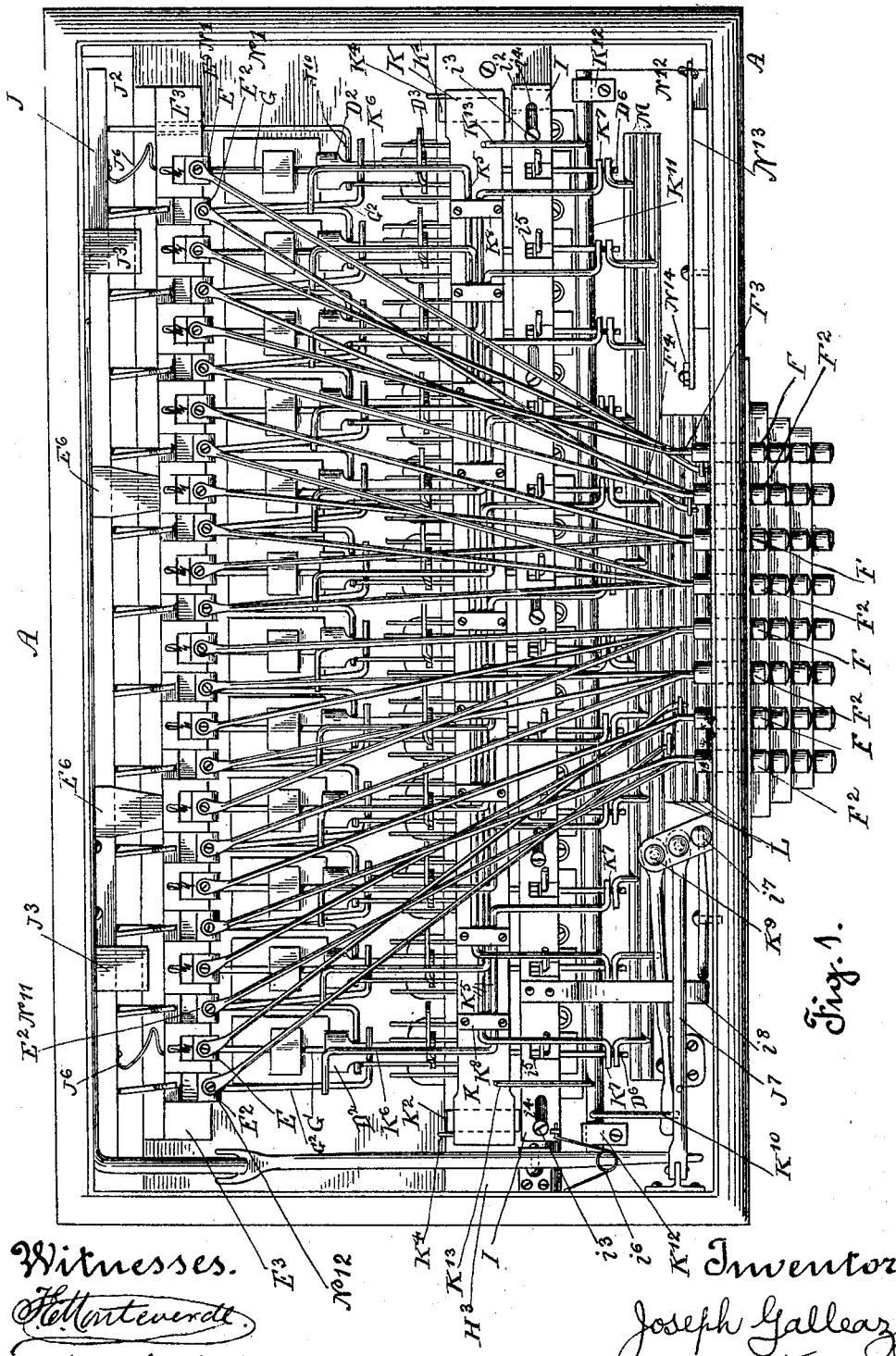

No. 795,795. PATENTED JULY 25, 1905.
J. GALLEAZZI.
ACCORDION.
APPLICATION FILED FEB. 15, 1900.

9 SHEETS—SHEET 1.

Witnesses.
H. Monteverdt
Alex Hildebrand

Inventor.
Joseph Galleazzi
by A. H. Ste. Marie atty

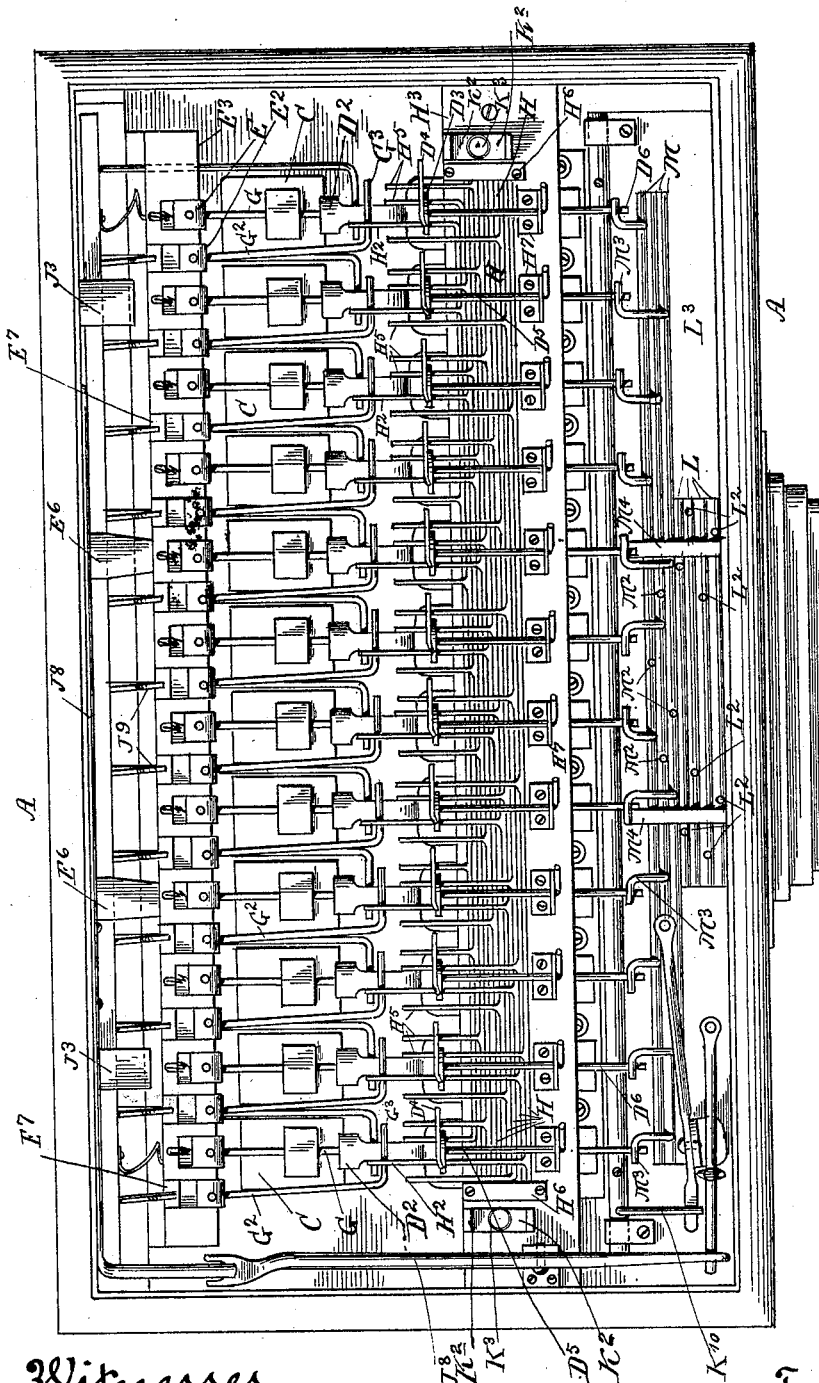

No. 795,795. PATENTED JULY 25, 1905.
J. GALLEAZZI.
ACCORDION.
APPLICATION FILED FEB. 15, 1900.
9 SHEETS—SHEET 3.
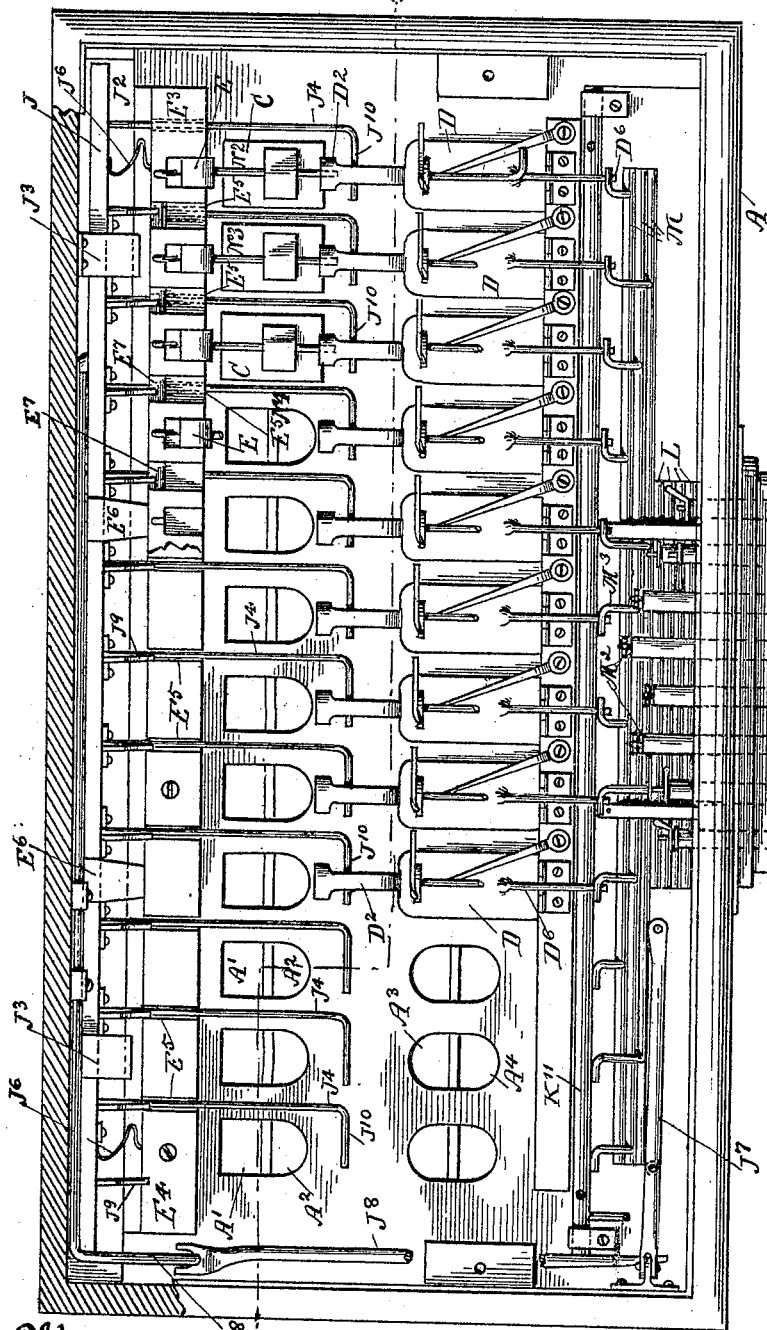
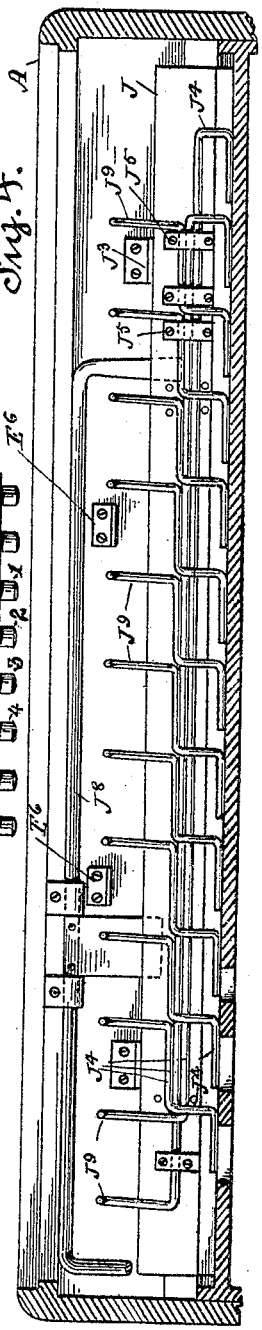
Witnesses:
Alex Hildebrand
M. J. J. Phelan
Inventor.
Joseph Galleazzi
by A. H. Ste Marie
atty

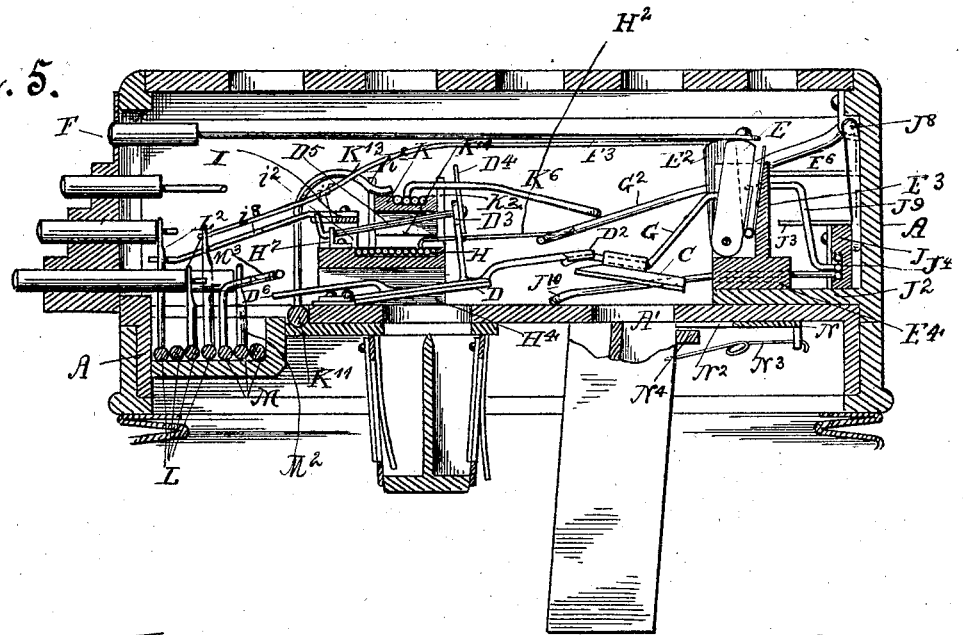
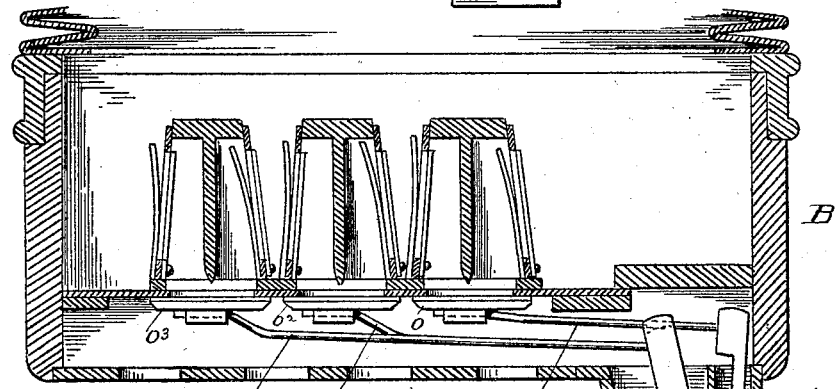
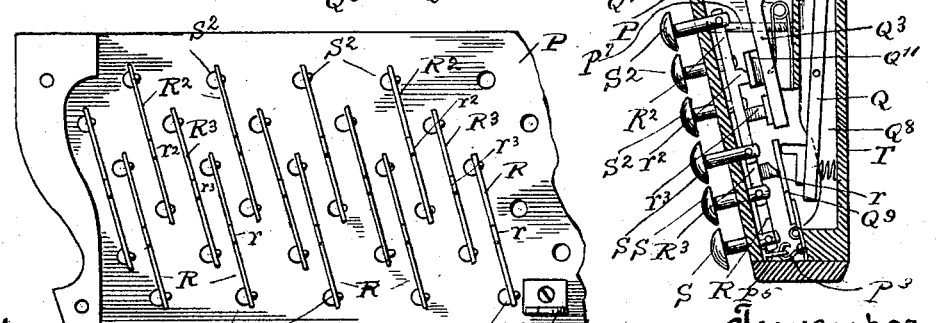

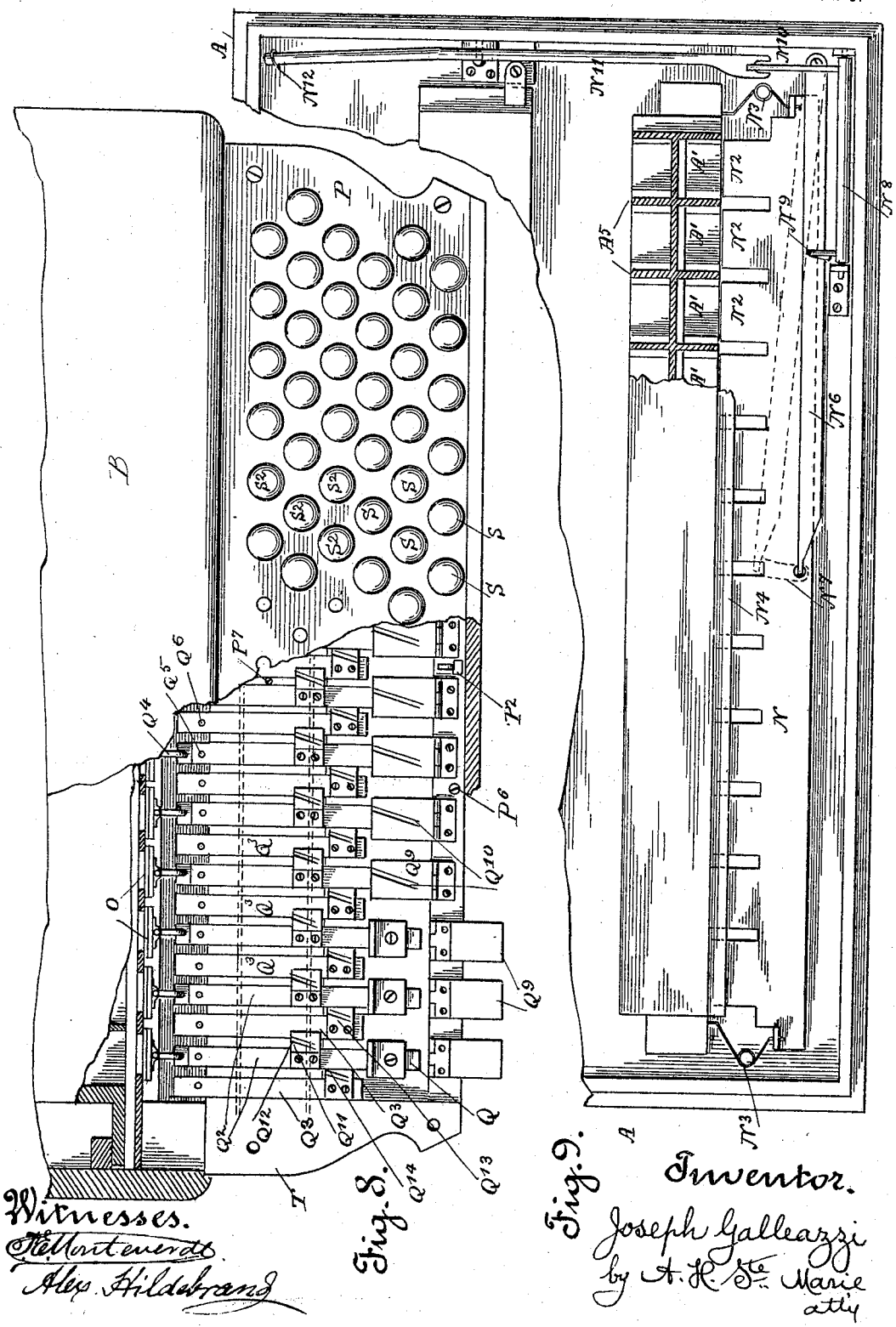

No. 795,795. PATENTED JULY 25, 1905.
J. GALLEAZZI.
ACCORDION.
APPLICATION FILED FEB. 15, 1900.
9 SHEETS—SHEET 7.
Fig. 12.
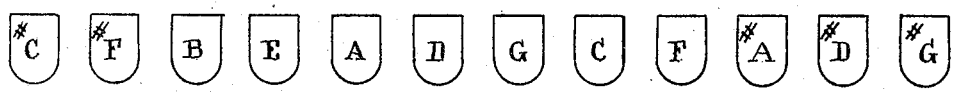
Fig. 13.
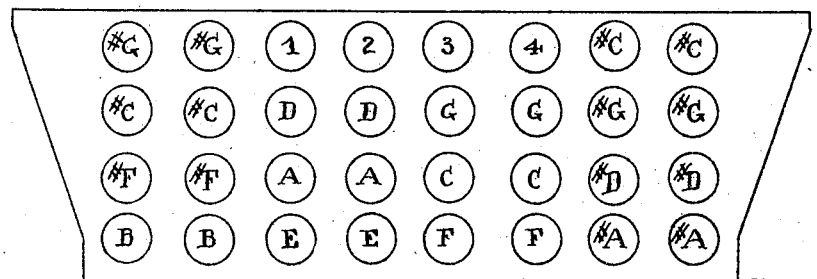
Fig. 14.
Witnesses. Inventor.
F. E. Monteverde Joseph Galleazzi
Geo. A. Proctor by A. H. Ste. Marie,
atty No. 795,795. PATENTED JULY 25, 1905.
J. GALLEAZZI.
ACCORDION.
APPLICATION FILED FEB. 15, 1900.

9 SHEETS—SHEET 8.

Witnesses.
H. Monteverde
Geo. A. Proctor

Inventor.
Joseph Galleazzi
by A. H. Ste. Marie
atty

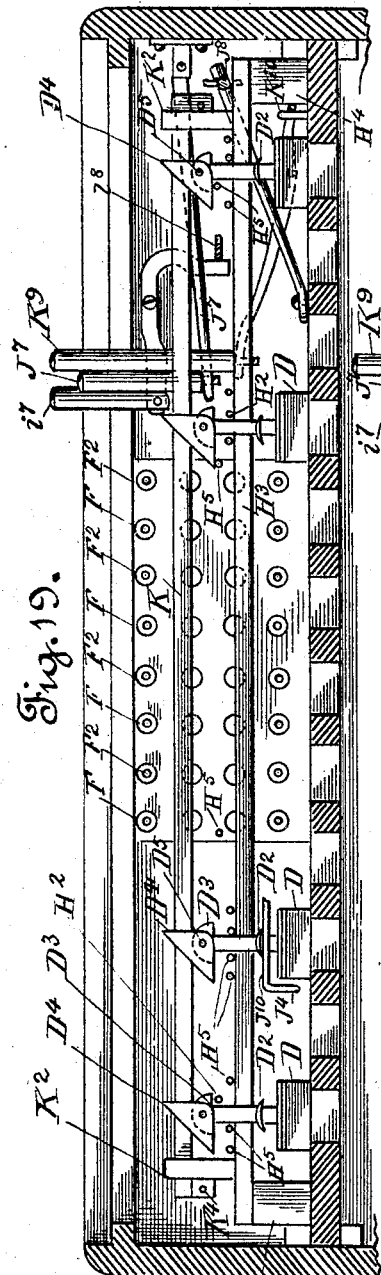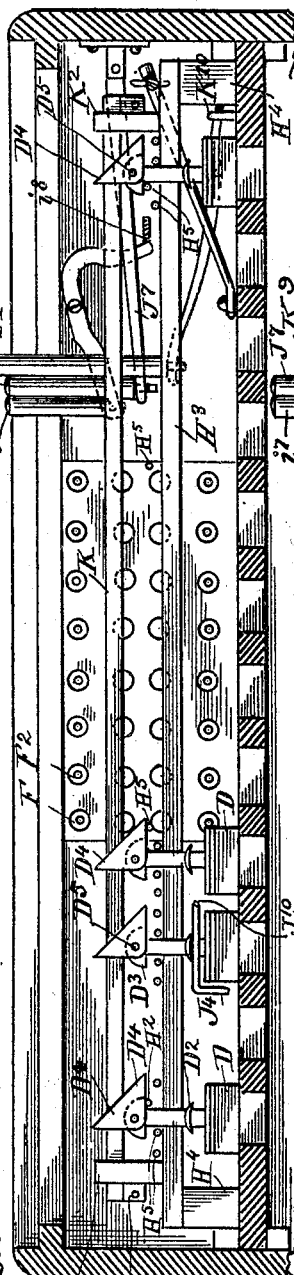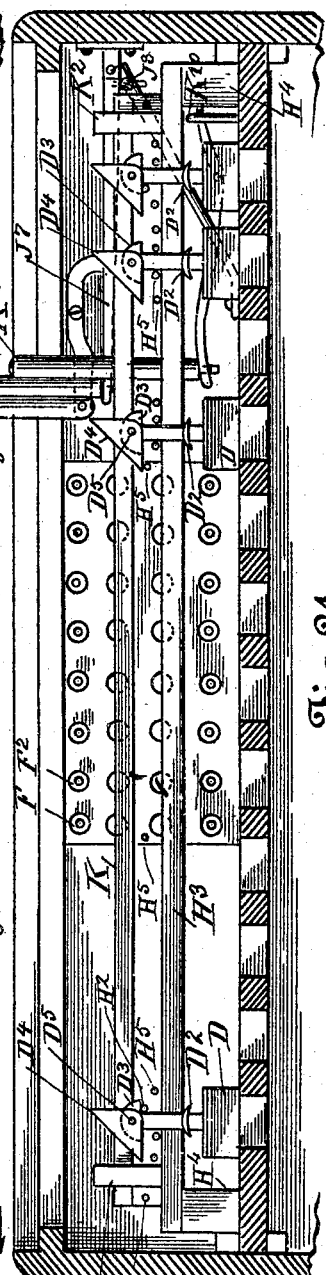

UNITED STATES PATENT OFFICE.

JOSEPH GALLEAZZI, OF SAN FRANCISCO, CALIFORNIA.

ACCORDION.

No. 795,795.  Specification of Letters Patent.  Patented July 25, 1905.

Application filed February 15, 1900. Serial No. 5,403.

*To all whom it may concern:*

Be it known that I, JOSEPH GALLEAZZI, of the city and county of San Francisco, in the State of California, have invented certain new and useful Improvements in Accordions and Similar Musical Instruments, of which the following is a specification.

My present improvement consists in adding to the instrument for which I have already been granted Letters Patent of the United States Nos. 517,648 and 566,269 and also for which there is now pending application Serial No. 630,175, an apparatus by which I can obtain chords of the ninth and of the diminished seventh and in improving the construction and arrangement of some of the parts connected with my former inventions. The first of my said patents, No. 517,648, is dated April 3, 1894, the second, No. 566,269, August 18, 1896, and my pending application was filed March 31, 1897.

My object is to make a more complete instrument, still preserving its compactness and lightness.

In my present construction by pressing a single key I obtain a major chord. By working the same key in connection with a lever which is worked by the thumb I get a minor chord. Using the same key and a different lever I get a chord of the seventh, and again the same key with still a different lever I get a chord of the ninth. I also have special keys on my accordion which give me chords of the diminished seventh. Another series of keys give me the plain notes.

Throughout my specification when I refer to "chords" I refer to several different notes blended in harmony and never to the same note sounded at the same time in different octaves.

The accordion is composed of two boxes A and B, connected by a bellows, which bellows is but partly shown in the drawings hereto annexed, but is fully shown in my Patent No. 517,648.

Figure 10:
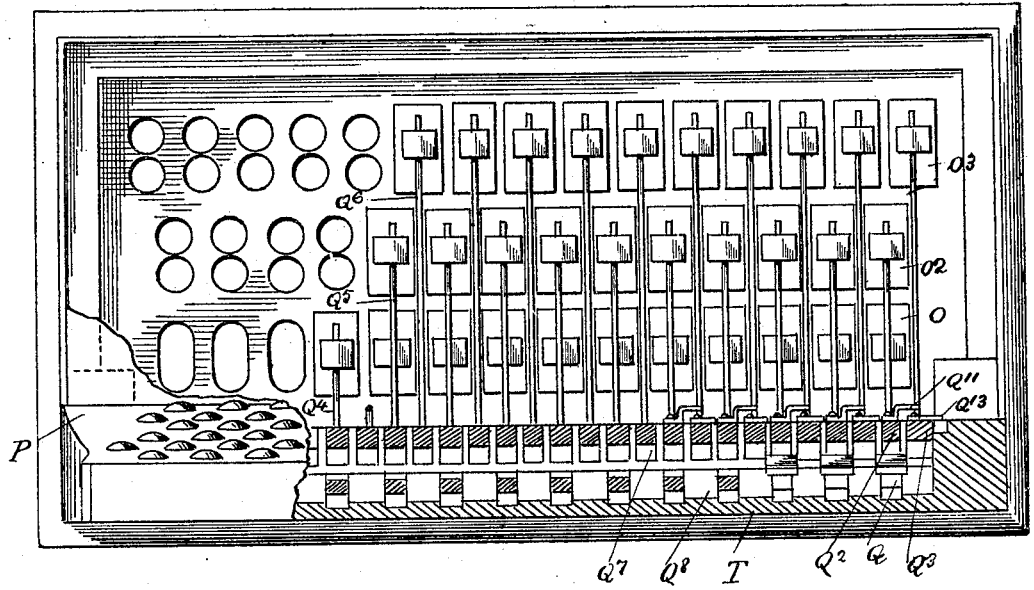
Figure 11:
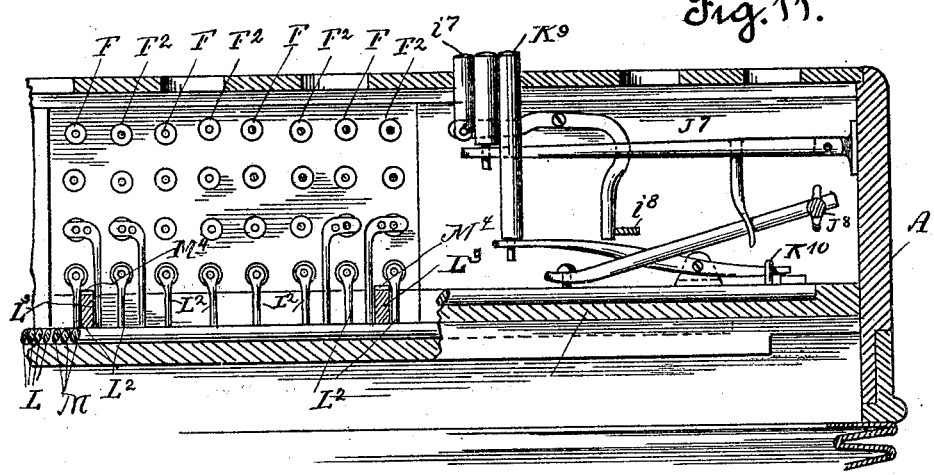
Figure 15:
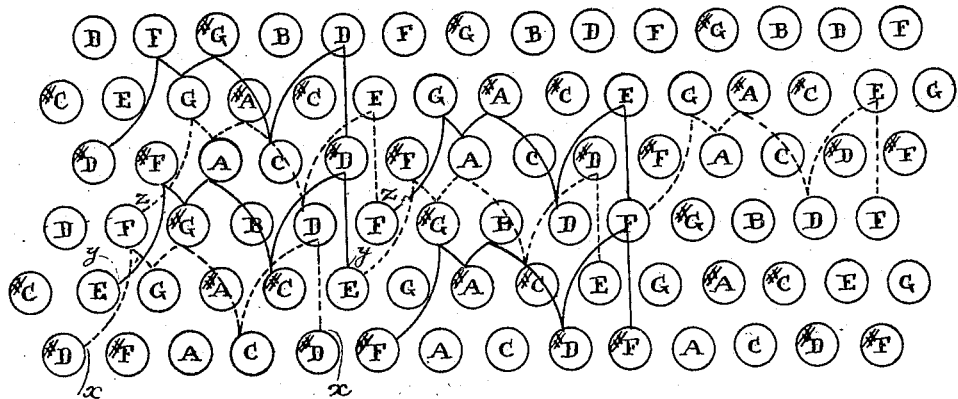
Figure 16:
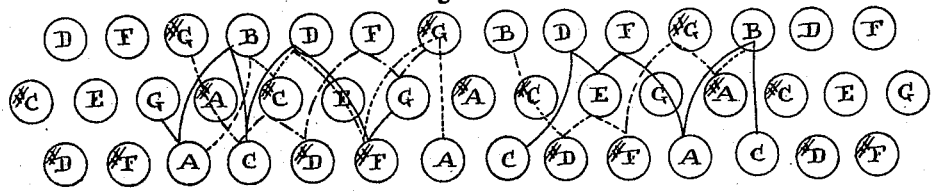
Figure 17:
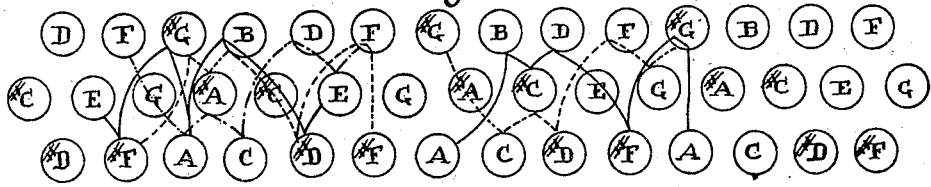
Figure 18:
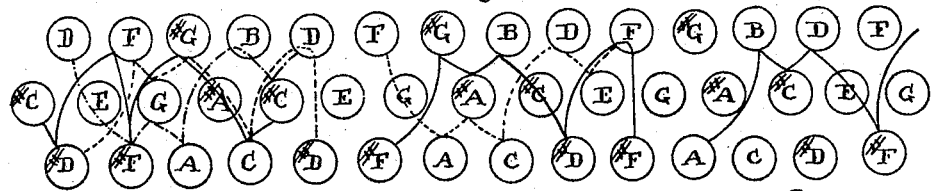

Referring to the said drawings, Figures 1, 2, and 3 are plans of the box or end A of the instrument, showing it open and at different stages of construction. Fig. 4 is a vertical longitudinal section on the line $xx$ of Fig. 3 looking rearward into the box A—that is, away from its keyboard—certain parts shown in the latter-named figure being omitted. Fig. 5 is a vertical cross-section of the same end of the instrument covered. Fig. 6 is a similar view of the opposite end of the accordion—that is to say, of the box B. Fig. 7 is a broken plan showing the under side of the keyboard at this end B. Fig. 8 shows the outside of the same keyboard attached to the box B and broken away to expose part of the underlying mechanism. Fig. 9 is a broken plan of the box A inverted, showing a stop thereunder. Fig. 10 is a plan of the box B, some of the within-lying parts being removed and its cover and keyboard almost entirely broken away. Fig. 11 is a sectional elevation showing about two-thirds of the inner front wall and adjoining parts of the box A and giving a rear view of its keyboard and chord mechanism. The corner of the box shown in this figure corresponds to the lower left in Fig. 1. Fig. 12 is a diagram representing the different tones that can be produced by the several reeds in this end A of the instrument. Fig. 13 is a diagram showing the different chords that can be played on the same end of my accordion by working the respective keys and the mechanism for changing from one chord to another. Fig. 14 is a diagram of the keyboard at the same end of the accordion. Fig. 15 is a diagram of the keys at the end B, indicating the tones that can be obtained by fingering the respective keys. The keys are in duplicate, those at either end of each of the levers shown in Figs. 6 and 7 working the same valve and giving the same tone. Each series of lines that run from one key to another, joining them in series of eights, indicates a different musical scale and shows that on my improved keyboard all scales can be played while keeping the hand in the same position and with the same moves of the fingers, whatever may be the clef or fundamental note. Figs. 16, 17, and 18 are diagrams of the single keyboard, which is used in ordinary accordions, instead of the double keyboard. (Represented by Fig. 15.) The lines that join the keys together in series of eights in these views illustrate how it is impossible on the single keyboard to play the different musical scales without placing the hand in several different positions and moving the fingers in several different ways. Figs. 19, 20, and 21 are vertical longitudinal sections of the box A looking forward thereinto—that is, toward the rear of its keyboard on the side opposite to Fig. 4. These three figures illustrate the working of the mechanism through which the chords are produced and varied.

As in my former patents, the box A is provided with four rows of divided valve-openings $A'$ $A^2$ $A^3$ $A^4$, (twelve in each row,) and each opening is connected with a reed-chamber, which is directly below it. Each reed-chamber has two reeds, so constructed that the valve being open one will produce a sound as the bellows is expanded and the other as the bellows is contracted. The reeds connected with $A'$ give the fundamental bass notes, $A^2$ the baritone, and the higher tones are produced by the reeds connected with $A^3$ and $A^4$. Major and minor chords, chords of the dominant and diminished sevenths, and chords of the ninth are all produced by the reeds under the apertures $A^3$ and $A^4$. The reeds are operated in pairs. The valve-openings $A'$ and $A^2$ are covered by the same valve C, and so are the openings $A^3$ and $A^4$ covered by a common valve D, which is hinged and spring-pressed. The valves are opened by twenty-four oscillating levers E and $E^2$, located perpendicularly in a lever-case $E^3$ and connected with the keys or digitals F and $F^2$ by means of key-rods $F^3$ and $F^4$. This lever-case $E^3$ rests upon a strip of wood $E^4$, which has twelve transverse grooves $E^5$ in it, provided for the mechanism producing chords of the seventh, hereinafter described, and said lever-case is held away from the back of the box A by two stops $E^6$. The back of each compartment containing one of the levers $E^2$ is notched out at $E^7$, so as to allow the upper end of a rock-shaft $J^4$ to come in contact with said lever, as hereinafter described.

The oscillating levers E are spring-pressed and connected with the keys F by the key-rods $F^3$. They are provided with rods G, which are bent down and fastened directly to the valves C. Each rod G extends beyond its valve C, so as to engage a hook $D^2$, attached to and extending from the valve D opposite, so when one of the keys F is pressed it works one of the oscillating levers E, and that opens one of the valves C, and the extension of the rod G engages one of the hooks $D^2$ and opens a valve D. This allows sound to be produced by the reeds in each of the reed-chambers, respectively, under the openings $A'$, $A^2$, $A^3$, and $A^4$ that are covered by the two valves raised, thus giving four sounds of the same note in three different octaves, two of the reeds producing the same note in the same octave.

The oscillating levers $E^2$ are worked by keys $F^2$ and key-rods $F^4$, similarly to the levers E. Rods $G^2$ extend forward from the oscillating levers $E^2$ and engage rods $H^2$ by means of a hook $G^3$ on the forward end of $G^2$ placed beneath $H^2$, as best shown in Figs. 2 and 5. The rods $H^2$ are attached to rock-shafts H, which work in the rock-shaft board $H^3$. Said board is situated directly above the spring-pressed valves D and rests upon two end supports $H^4$, Figs. 5, 19, 20, and 21. These rock-shafts are made of smaller wire than in my former patents, so that they occupy a less space. They are of various lengths, and each rock-shaft has one rod or arm $H^2$ and three rods $H^5$, slightly shorter than $H^2$, all projecting toward the back of the box A. Most of the rock-shafts H are shorter than the board $H^3$, and to prevent end displacements wires of the same diameter as the rock-shafts are used to fill up the spaces. The rock-shafts and wires are held firmly in the rock-shaft board $H^3$ by small plates $H^6$. The longer rods $H^2$, which are engaged by the rods $G^2$, are situated under one projection of double hooks $D^3$, attached to the top of the valves D. The three shorter rods $H^5$ are located one beneath the other projection of $D^3$ and the two others also below and on each side of $D^3$ beyond its projections, so that either of these two rods will engage one of a series of triangular oscillatory hooks $D^4$, according as the triangular hook is inclined, as shown in Fig. 19 or as shown in Fig. 20. As in my former patent, No. 566,269, the triangular hooks $D^4$ are situated just back of the hooks $D^3$ and held in place each by a small rod $D^5$ passing through a hook $D^3$ and through a small plate $H^7$, fastened to and standing at right angles to the rock-shaft board $H^3$. The legs of the triangle forming the hooks $D^4$ are of the same length and are longer than the projections of the hooks $D^3$. In operation this rock-shaft mechanism works as follows: A key $F^2$ is pressed. A hook $G^3$ on rod $G^2$ is raised to engage one of the long rods $H^2$. That rod engages a hook $D^3$ and raises one of the valves D, which is attached to $D^3$; but since the rod $H^2$ is attached to one of the rock-shafts H it also raises the three other rods $H^5$ attached to the same rock-shaft. One of the rods $H^5$ thus raised engages another of the hooks $D^3$, and thereby raises a second valve. The two other rods raised are so situated with relation to the triangular hooks $D^4$, one on the right and the other on the left, that when said hooks $D^4$ are in their normal position, inclined, as shown in Fig. 19, one of them will be engaged by the rod that is on the side to which they are inclined and a third valve will be raised, while the other rod, located on the opposite side, is free and unengaged. Thus it will be seen that when one key $F^2$ is operated three of the valves D are opened, and the rods are so arranged on the rock-shaft that they open three valves necessary to produce a major chord.

As in my said Patent No. 566,269, there is a sliding plate I, that rests on little supports $i^2$ on the rock-shaft board $H^3$ and is held in place by screws $i^3$, that pass through slots $i^4$ in said plate and into said supports. This plate is provided with notches $i^5$, engaging the ends of the rods $D^5$ that pass through the plates $H^7$ and which are obliquely upturned, and it is kept in the normal position (shown in Fig. 1) by a spring $i^6$. Plate I can be slid lengthwise against the action of spring $i^6$ by means of a thumb-lever $i^7$, which engages an arm $i^8$, that projects forward from said plate I.

When the plate I is moved by the lever $i^7$, as just described, it raises the obliquely-upturned ends of the wires $D^5$, and they incline the triangular hooks $D^4$, as represented in Fig. 20. By this operation the rod $H^5$, which engaged one of the hooks $D^4$ while in their normal position, is free and the rod $H^5$, which was before free, now engages one of the hooks $D^4$. So it will be seen that when the plate I is moved against the spring $i^6$ two of the three valves D which were opened before are again opened by pressing one of the keys $F^2$; but a different valve is opened in place of the third one. This gives the minor of the same chord which the same key $F^2$ gave as the major before the thumb-lever $i^7$ was operated.

To produce chords of the dominant seventh, I open the three valves D which give either the major or the minor chords and one extra valve D by means of the following mechanism: A rock-shaft board J is placed edgewise back of the lever-case $E^3$, where it is held down against a little strip of wood $J^2$, fastened to the bottom of the box A, by two stops $J^3$. (See Figs. 1 to 5, inclusive.) This board J carries twelve rock-shafts $J^4$ under plates $J^5$ and is kept normally against the back of the box A by springs $J^6$. One end of each rock-shaft $J^4$ held by the rock-shaft board J is bent upward and again forward, so that when the rock-shaft board J is moved forward by the thumb-lever $J^7$ and connecting-levers $J^8$ these upper ends $J^9$ of the rock-shafts $J^4$ fit in the notches $E^7$ in the lever-case $E^3$ and against the top of the oscillating levers $E^2$. The other end of the rock-shafts $J^4$ projects forward and down through the transverse grooves $E^5$, heretofore referred to, in the strip of wood $E^4$, upon which the lever-case $E^3$ rests, and so that the hook $J^{10}$ on the said lower projection of the rock-shafts $J^4$ is beneath and prepared to engage one of the hooks $D^2$. These transverse grooves $E^5$ are situated directly under the oscillating levers $E^2$, except that there is none under $E^2$ No. 12 and there is one on the left side of the first lever of the series E. The lower projection of the rock-shaft whose upper end comes in contact with the top of lever $E^2$ No. 1 passes through groove $E^5$ No. 3. The rock-shaft whose upper end bears against $E^2$ No. 2 has its lower end in $E^5$ No. 4, &c., the lower projection of each rock-shaft $J^4$ working thus in the groove $E^5$ under the lever $E^2$ that is next to the one against which the upper arm of the same rock-shaft engages, except that the rock-shaft whose upper arm engages oscillating lever $E^2$ No. 11 passes through $E^5$ No. 1 and the one which engages $E^2$ No. 12 passes through $E^5$ No. 2.

If the key working $E^2$ No. 1 is pressed, it normally produces a major chord by opening the valves D Nos. 1, 12, and 9, as indicated in the upper left corner of Fig. 13; but by pressing the thumb-lever $J^7$ at the same time, as represented in Fig. 19, $E^2$ No. 1 engages the upper arm $J^9$ of the rock-shaft $J^4$, which is behind it, and that raises the hook $J^{10}$ on the lower projection of said rock-shaft, which in its turn engages the hook $D^2$, attached to D No. 3, and opens this last-named valve. Thus the fourth valve is opened and a chord of the seventh produced, which chord is indicated in the third section from the top on the left of said Fig. 13. Other chords of the seventh are produced in a similar manner by working the thumb-lever $J^7$ in connection with the keys which operate the other oscillating levers $E^2$ and, if desired, by depressing also at the same time the before-mentioned lever $i^7$, as exemplified in Fig. 20.

To produce chords of the ninth, I have provided another rock-shaft board K above the rock-shaft board $H^3$, which board K, Figs. 1, 2, and 5, fits in two U-shaped supports $K^2$, one near each end of the said board $H^3$. The board K rests upon two coiled springs $K^3$, one in each U-shaped support, as shown in Fig. 2, and is prevented from moving endwise by small pins $K^4$, one of which passes through each end of said board K just beyond its support. This board K has twelve short rock-shafts $K^5$ in four rows. One end of each rock-shaft $K^5$ is bent backward, so that the kook $K^6$ upon its end hangs directly above one of the rods $G^2$, which project from the oscillating levers $E^2$. The other end of each rock-shaft $K^5$ extends forward and downward, so that the hook $K^7$ upon its end hangs just above a lever $D^6$, provided on each valve D. These rock-shafts are held in the rock-shaft board K by little plates $K^8$, fastened transversely across the top of said board. The rock-shafts are brought into action by the thumb-lever $K^9$, which by a suitable lever mechanism $K^{10}$ works the large rock-shaft $K^{11}$. Said rock-shaft $K^{11}$ is embedded in the bottom of the box A just in front of where the hinges of the valves D are fastened and is held down by two little strips of metal $K^{12}$, one bearing upon each end of said rock-shaft. Four arms $K^{13}$ project upward from said rock-shaft $K^{11}$ and are curved back so that their upper ends rest on the top of the rock-shaft board K.

When the thumb-lever $K^9$ is pressed, it rolls the rock-shaft $K^{11}$, and thus causes the arms $K^{13}$ to press down the rock-shaft board, which, as before mentioned, is supported by the springs $K^3$, until the front and back arms of the rock-shafts $K^5$, respectively, come in contact with the levers $D^6$ of the valves D and with the rods $G^2$, thereby providing means for opening each valve from front or rear or on either side of its hinge. This rock-shaft board K is kept from going too far down by three stops $K^{14}$, fastened to the top of the lower rock-shaft board $H^3$. If one of the keys $F^2$ is pressed while the rock-shafts $K^5$ are thus down, it raises the three valves which produce major chords, as before described, and it also opens a fourth valve, that is so arranged as to give the ninth of a chord of the ninth in the same letter as the major chord. Fig. 21 shows four valves opened in this way, which give the first of the line of ninth chords included in Fig. 13. The fourth valve D is opened by the rod $G^2$ as it rises, engaging the back end $K^6$ of the rock-shaft $K^5$, which is situated just above it. That depresses the front end $K^7$ of the same rock-shaft until it bears upon one of the levers $D^6$, and so opens the valve to which this lever is attached. Minor chords are changed to chords of the ninth in a similar manner.

The mechanism used to produce chords of the seventh may be used to produce chords of the ninth, and conversely, the only change necessary being to bend the rock-shafts in such a way that they will open the necessary valves.

The keys or digitals are arranged in four rows or banks of eight keys each; but up to this point I have been speaking only of the first three rows from the top of the box A when the instrument is in the position shown in Figs. 1 and 5 or from the bottom when in the position indicated by the diagrammatic view Fig. 14. In those three banks the first, third, fifth, and seventh keys (marked F) in each bank are connected with the oscillating levers E, and the second, fourth, sixth, and eighth (marked $F^2$) are connected with the oscillating levers $E^2$. The fourth bank likewise has eight keys. The first and second keys in the fourth bank open the same valves, respectively, as the seventh and eighth in the third bank, are auxiliary to them, and give an ordinary note in G-sharp and major, minor, seventh, or ninth chords in G-sharp. The seventh and eighth keys of the fourth bank open the same valves, respectively, as the first and second in the third bank, are auxiliary to them, and give major, minor, seventh, or ninth chords in C-sharp and an ordinary note in C-sharp. These duplicate keys in the fourth bank are connected with the keys in the third bank by means of four short rock-shafts L, which are situated in the front part of the box A and are sunk about one-quarter of an inch into its bottom. Each of the rock-shafts L has two arms $L^2$ extending upward, one of which is attached to the inner end of one of the keys in the fourth bank, and the other arm is attached to the corresponding key in the third bank of keys and also to the key-rod $F^3$ or $F^4$, which connects the key in the third bank with its oscillating lever E or $E^2$. The object of having these auxiliary keys is to facilitate the passage from the tone or chord of G-sharp to the tone or chord of C-sharp. It will be seen that by having the four keys which give these tones and chords repeated on each side of the keyboard the fingers can readily pass from one to another of said keys and strike them alternately as often as desired without reaching each time across the entire keyboard no matter at which side of it the hand may be when fingering the first key. (See Figs. 1, 2, 3, 5, and 11.)

The four middle keys of the fourth bank (lowest bank, Figs. 3 and 5, and top bank, Fig. 14) are used to produce three chords of the diminished seventh by each opening four of the valves D. (The third and sixth keys, respectively marked 1 and 4 in Fig. 14, work the same mechanism and open the same valves.) These four middle keys, bearing the numbers 1, 2, 3, and 4, Figs. 3 and 14, are attached to arms $M^2$ of three long rock-shafts M, the middle one of said rock-shafts having two arms for keys 1 and 4. Said rock-shafts M are situated just back of and in the same plane as the short rock-shafts L, and each of them has four hooks $M^3$, which reach upward, so that one of these hooks remains just above the lever $D^6$ to each of the valves D. When one of the keys is pressed, it rocks one of these long shafts M and brings its four hooks $M^3$ upon the levers of four valves D, and thus opens the four required valves. The three rock-shafts M and the four rock-shafts L are kept down by blocks $L^3$ and plates $M^4$, Figs. 2 and 11, which are fastened down upon them.

The deeper bass notes are produced through the openings $A'$ and may be shut off by the stop N. (Shown in Figs. 5 and 9.) This stop consists of a plate, preferably made of aluminium, which is notched in one edge, so as to make twelve tongues $N^2$, adapted to fit in and completely stop the twelve openings $A'$. It is situated on the under side of the bottom of box A and is kept back in the normal position (shown in Figs. 5 and 9) by a spring $N^3$ at each end. It is guided and held firmly against the bottom of box A by a little strip of wood $N^4$, fastened to the partitions $A^5$, that are between the air-chambers. The stop is operated by a lever $N^6$, pivoted at one end and bent up at its other end, so as to catch the stop about its middle. The end that is bent goes clear through the stop and works in a groove $N^7$ in the under side of box A, so as to guide and steady the movement of said stop. Lever $N^6$ is worked by a rock-shaft $N^8$, having two arms projecting from it. One arm $N^9$ reaches up to engage said lever $N^6$, and the other arm $N^{10}$ extends forward, so as to be caught between claws of a second lever $N^{11}$, which is pivoted and extends across the end of the box A. Lever $N^{11}$ is caught at its other end by a wire $N^{12}$, which passes up through the bottom of the box and fastens to the right end of a third lever $N^{13}$, as shown in Fig. 1. This last lever $N^{13}$ is pivoted to the inside of the front of box A to the right of the keyboard and is worked by a link $N^{14}$, which passes up through the top of box A and is provided with a suitable top piece, so that it may be operated by the palm of the hand. By pressing this palm-lever the stop N is closed. By releasing it the springs $N^3$ force it back to the normal position, as shown in Figs. 5 and 9.

The music produced by the end B of the instrument, Figs. 6, 7, 8, and 10, is particularly adapted to accompanying singers, and the tones secured are shown in the diagram Fig. 15. This end of the accordion is provided with three rows of valves O, $O^2$, and $O^3$. Each valve covers an opening that is divided as in the other end of the instrument. The first row of valves O in front of the keyboard contains fourteen valves, the second row $O^2$ also fourteen, and the third or back row fifteen valves. As at the end A, there are two reeds in each compartment under each valve-opening, so that whether the bellows of the accordion be expanded or contracted one reed is sounded in each of the two compartments under each valve raised. The valves are raised by oscillating levers Q, $Q^2$, and $Q^3$, placed perpendicularly in three series back of the keyboard, and by rods $Q^4$, $Q^5$, and $Q^6$, which project from the lower end of the levers and attach directly to the valves, as shown. The oscillating levers $Q^2$ and $Q^3$, which respectively raise the valves $O^2$ and $O^3$, are side by side in a lever-case $Q^7$, while the levers Q which raise the valves O are in another case $Q^8$ and are situated directly back of the levers $Q^2$. All of these oscillating levers are spring-pressed, so as to normally keep the valves closed.

The levers Q $Q^2$ $Q^3$ and rods $Q^4$ $Q^5$ $Q^6$ are oscillated in order to raise the valves O $O^2$ $O^3$ by means of other levers R $R^2$ $R^3$, provided each with a bearing-point $r$ $r^2$ $r^3$ and two keys S $S^2$. The one end of each of the oscillating levers Q is covered by a hinged plate $Q^9$, Figs. 6 and 8, which rests upon it and which plate has an oblique groove $Q^{10}$ across its face to receive the bearing-point $r$ of a lever R. A small plate $Q^{11}$, slightly raised and having a similar oblique groove $Q^{12}$ across its face, is screwed to the top of each oscillating lever $Q^2$ and projects to one side, so as to receive the bearing-point $r^2$ of a lever $R^2$. A similar plate $Q^{13}$, also having an oblique groove $Q^{14}$, is likewise secured to the top of each oscillating lever $Q^3$ and engages the bearing-point $r^3$ of a lever $R^3$. A board P, shown in Figs. 6, 7, and 8, fits over these levers in such a manner that the bearing-points of the double-keyed levers R $R^2$ $R^3$, respectively, fit in the oblique grooves in the plates $Q^9$ $Q^{11}$ $Q^{13}$. The levers R $R^2$ $R^3$ are pivotally or loosely attached at each end to the stems of the keys S $S^2$ close to the under side of the board P and have the bearing-point in their center, so that if either key is pressed it causes the bearing-point of the lever to which it is connected to press upon the end of the oscillating lever which it is designed to engage, and thus open a valve. These keys are located on the outside of the board P, and their stems pass through said board and fasten to the levers R $R^2$ $R^3$, as just mentioned.

Two little hooks $P^2$, Fig. 8, and $P^3$, Fig. 6, are fastened to the top of the frame T, which holds the levers Q $Q^2$ $Q^3$ and their cases, and are passed through eyes $P^4$ and $P^5$, Figs. 6 and 7, in the board P, so as to prevent said board, which is made of thin wood, from bulging out at the top. The board P is kept from bulging at the bottom by the top of the box B, which fits closely against it, and it is kept from bending inward by three screws, as $P^6$, which act as stops, driven in the upper part of said frame T, and two more, as $P^7$, driven in the lever-case $Q^7$. (See Figs. 6 and 8.) Said board is itself firmly screwed at each end to the frame T, and its outer edge and the top of frame T are covered both by a strip of wood. (Not shown.)

It will be seen from the foregoing that each valve O, $O^2$, or $O^3$ can be worked by either of two keys—that is, I have a double keyboard so arranged as to give the freest and easiest movement of the fingers in playing. The keys are arranged in duplicate across the keyboard in six rows, the keys in each row being in groups. The first row at the outer edge of the board P and their duplicate keys in the fourth row open the first series of valves O. The second series of valves $O^2$ are opened by means of the third and sixth rows of keys and the third series of valves $O^3$ by the second and fifth rows of keys.

The object of the double keyboard is to enable the person who performs on my accordion to play any piece desired and that in any given key by following always the same line of movement for the fingers, hand, and arm. A further object is to afford means for obtaining a more perfect quaver. As will be seen by reference to the diagram Fig. 15, the lines $x$ $x$, $y$ $y$, and $z$ $z$ therein, which join together the notes of different musical scales, all run in identical directions. By grouping the keys in the manner shown—that is, arranging them so that the groups of any three lines form what I shall call "a set" and control the reeds of a chromatic scale—any of the twelve musical scales can be run up on the instrument without changing the direction of a single line. The scales of D-sharp, F-sharp, A, and C can be played in different octaves by running the fingers over the first, second, and third rows of keys. The scales of C-sharp, E, G, and A-sharp in different octaves will be had by playing on the keys of the second, third, and fourth rows. The scales of D, F, G-sharp, and B will be rendered by fingering the keys of the third, fourth, and fifth rows, also in different octaves, if desired. There is but one road for the fingers to follow in playing all these difrerent musical scales. The course for all is the same as is indicated, for instance, by the lines *x x* at the left lower corner of the diagram, where said lines run from D-sharp to F, to G, to G-sharp, to A-sharp, to C, to D, and again to D-sharp. This gives us a full gamut. All the gamuts are run up the same way, as indicated by the various lines. The only thing required for a change of key is to carry the hand one move forward—for example, from D-sharp to E, to F, and so on. Outside of that it is simply necessary to learn how to play a musical composition in one key on my instrument and the performer can without further study play the same in any key that may be called for, because the moves of the fingers, hand, and arm are identically the same for all the keys. It is not so with instruments that have the single keyboard. A glance at the diagrams Figs. 16, 17, and 18 will show that in order to play the twelve musical scales on these instruments the fingers have to be moved in no less than three different ways and follow lines that cross one another. (See, for instance, the lines indicating the scales of A, G, and G-sharp in Fig. 16, the scales of E, F, and F-sharp in Fig. 17, and the scales of C-sharp, D, and D-sharp in Fig. 18.) To play some of the scales there indicated, one must of necessity hold the arm, hand, and fingers in a very awkward position. Besides, a player who will have practiced on such a keyboard so as to play a musical piece in a certain key will not be able to play readily the same piece in another key, not at least without much preparation.

It will be observed that on my instrument all the twelve scales can be played with only five rows of keys of the double keyboard, and therefore the sixth row of keys is not required for this purpose and could be dispensed with. I prefer keeping the sixth row, however, in order to have duplicate keys corresponding to those of the third row. In this way I can have two keys that are alike on both ends of all the levers R R² R³. It will be understood that as these levers are balanced on a central fulcrum or bearing point the keys at their ends, which both give the same note, can be alternately depressed in such a way as to give a much more perfect quaver than can be produced by repeatedly striking a single key after the usual manner.

I claim—

1. In an instrument of the class described, the combination of valves, an operating-key, mechanism operated by said key for opening said valves in series to produce triads, mechanism for changing one valve of the series whereby either a major or a minor chord is produced, two or more independent valves and operating mechanisms therefor, and means for placing either one of said last-mentioned mechanisms in position to be actuated by said key whereby one or the other of said independent valves is operated with either the original or the altered series so as to change either the major or minor chord to either a chord of the seventh or a chord of the ninth.

2. In an instrument of the class described, the combination of valves, an operating-key, mechanism operated by said key for opening said valves in series of three to produce major and minor chords, means for effecting a change in the series so as to obtain either chord, two or more supplemental valves and mechanism for operating the same including rock-shafts normally out of operative relation with said key, and means for bringing either one of the rock-shafts into operative relation with said key.

3. In an instrument of the class described, the combination of valves, an operating-key, mechanism operated by said key for opening said valves in series of three to produce triads, means for causing the opening of another valve for one of the series of three, two or more additional valves and mechanisms for operating the same including each a rock-shaft normally out of operative relation with said key, and means for moving said rock-shaft into operative relation with said key whereby one or the other of the additional valves can be opened with either the original series or the altered series of three.

4. In an instrument of the class described, the combination of valves, an operating-key, mechanism operated by said key for opening said valves in series of three, means for causing the operation of another valve in place of one of said series of three to change a major to a minor chord, two or more supplementary valves and mechanisms for operating the same comprising each a rock-shaft and a spring-pressed board carrying said rock-shaft, and means for moving either board to place the rock-shaft thereon under control of the operating-key.

5. In an instrument of the class described, the combination of valves, an operating-key, mechanism operated by said key for opening a series of said valves to produce a common chord, a supplementary hinged valve having a rearward projection, mechanism for operating said hinged valve comprising a rock-shaft having one arm adapted to bear on said rearward projection and another arm arranged for connection with said key, and means for bringing the arms of said rock-shaft into operative relation with said key and the rearward projection of the hinged valve.

6. In an instrument of the class described, the combination of valves, an operating-key, and mechanism operated by said key to open said valves in a series of four consisting of a rock-shaft having an arm connected with said key, and hooks connected with said rock-shaft and operating parts connecting to the valves to unseat said valves.

7. In an instrument of the class described, the combination of bass and melody reeds located in suitably-divided compartments under valve-openings, valves controlling the same, means to operate said valves, a stop consisting of a spring-pressed plate notched so as to form tongues that will fit in the compartments for the bass reeds and close the valve-openings thereover, and mechanism for moving said stop.

8. In an instrument of the class described, the combination of one or more valves, mechanism for operating the same comprising an oscillating lever, a key-rod, and a rock-shaft having two arms one of which is connected with said key-rod, and keys connected with each one of said arms.

9. In an instrument of the class described, the combination of a valve and an operating-lever therefor having a key at each end the operation of either of which keys will operate said valve.

10. In an instrument of the class described, the combination of valves arranged in three rows, and five rows of keys therefor, the keys in the fourth and fifth rows controlling the same reeds as the keys in the first and second rows respectively.

11. An instrument of the class described having valved openings with reeds therein, an operating-key, reed-exposing mechanism operable by said key to permit the sounding of certain reeds in a triad, mechanism adapted to bring into play other reeds and thereby change to or from either major or minor chord, two or more independent valved openings also including reeds, mechanisms for uncovering said independent openings, and means for placing either one of said last-mentioned mechanisms in position to be actuated by said key whereby one or the other of said independent openings is uncovered and reeds are sounded that will give either a chord of the seventh or a chord of the ninth.

12. In an instrument of the class described, means for uncovering the reeds of a major chord, means for uncovering the reeds of a minor chord, a key for operating said means, means for changing from either chord to the other, and mechanisms operable with said key for uncovering other reeds alternately and simultaneously with the reeds of one of said chords and thereby sounding different chords.

13. In an instrument of the class described, valves and reeds controlled thereby, mechanism for exposing said reeds so as to sound common chords, operating-keys therefor, a board with rock-shafts thereon overlying said mechanism, and means for placing said board and its rock-shafts into operative relation with said mechanism to enable it to expose other reeds, so that the fingering of the same keys will operate to change the common to higher chords.

14. In an instrument of the class described, keys and mechanism for sounding the reeds of common chords, two sets of rock-shafts, and means for moving either set to cause one rock-shaft and one of said keys and the thereto appertaining mechanism to sound the reeds of a chord of the seventh or of the ninth.

15. In an instrument of the class described, valves and reeds controlled thereby, keys and mechanism for sounding the reeds of common chords, movable boards and rock-shafts thereon, the ends of each rock-shaft being adapted to contact with the mechanism for uncovering said reeds, and means for moving either board to cause said keys and mechanism to expose other reeds and thereby sound chords of the seventh or of the ninth.

16. In an instrument of the class described, a hinged valve, and means at each end of the valve for operating it.

17. In an instrument of the class described, a hinged valve having a hook at one end and a lever at the other, and means for engaging with said hook and lever respectively, to open the valve.

18. In an instrument of the class described, valves and reeds controlled thereby, a keyboard comprising a plurality of rows with a plurality of keys in each row, a portion of the keys at one end of one of the rows being operatively connected with the same valves as a portion of the keys at the opposite end of another row.

19. In an instrument of the class described, valves and reeds controlled thereby, a keyboard comprising four rows with eight keys in each row, and means for connecting two of the keys at each end of one of the rows with the same valves that are connected with two of the keys at the opposite ends of the adjacent row.

20. In an instrument of the class described, valves and reeds controlled thereby, a keyboard, and means connected with a portion of the keys thereof enabling each key in said portion to control the reeds of a diminished seventh chord.

21. In an instrument of the class described, valves and reeds controlled thereby, a keyboard comprising a plurality of rows with a plurality of keys in each row, and means connected with a portion of said keys for controlling the valves for the reeds of a diminished seventh chord, two of said last-mentioned keys being connected with the same valve-controlling means.

22. In an instrument of the class described, valves and reeds controlled thereby, and a keyboard comprising a plurality of rows with a plurality of keys in each row, said keys being arranged in sets so that the fingering of the same relatively arranged keys in any set will always produce the same relatively arranged tones.

23. In an instrument of the class described, valves and reeds controlled thereby, a keyboard comprising a plurality of rows with a plurality of keys in each row, the keys in each row being arranged in groups of four and the corresponding groups of three adjacent rows forming a set, and means for connecting said keys to the valves so that the same relatively arranged keys in each set will sound the same tones in any key that is being played.

24. In an instrument of the class described, a wind-chest having its reed-chambers arranged in a row, reeds in said chambers, valves and keys for controlling said reeds, a laterally-movable plate arranged to slide across said row of chambers for shutting off the wind therefrom, and means for moving said plate.

Signed by me at San Francisco, California, this 7th day of December, 1898.

JOSEPH GALLEAZZI. [L. S.]

Witnesses:
A. H. STE. MARIE,
CHAS. T. STANLEY.